US007616595B2

(12) United States Patent
Classon et al.

(10) Patent No.: US 7,616,595 B2
(45) Date of Patent: Nov. 10, 2009

(54) METHOD AND APPARATUS FOR SCHEDULING FREQUENCY SELECTIVE AND FREQUENCY DIVERSE ALLOCATIONS IN MOBILE COMMUNICATIONS SYSTEMS

(75) Inventors: Brian K. Classon, Palatine, IL (US); Hao Bi, Lake Zurich, IL (US); Ravi Kuchibhotla, Gurnee, IL (US)

(73) Assignee: Motorola, Inc., Schaumburg, IL (US)

( * ) Notice: Subject to any disclaimer, the term of this patent is extended or adjusted under 35 U.S.C. 154(b) by 445 days.

(21) Appl. No.: 11/330,475

(22) Filed: Jan. 12, 2006

(65) Prior Publication Data

US 2007/0159993 A1 Jul. 12, 2007

(51) Int. Cl.
*H04B 7/204* (2006.01)
*H04W 72/00* (2006.01)

(52) U.S. Cl. .................. 370/319; 370/343; 370/344; 370/345; 455/452.1; 455/63.1; 455/456.1; 455/456.5; 455/456.6

(58) Field of Classification Search .................. 370/319, 370/343, 344, 345; 455/452.1, 63.1, 456.1, 455/456.5, 456.6, 453
See application file for complete search history.

(56) References Cited

U.S. PATENT DOCUMENTS

| 5,752,187 A | 5/1998 | Frank et al. |
| 5,870,393 A | 2/1999 | Yano et al. |
| 6,674,324 B1 | 1/2004 | Ocenasek et al. |
| 6,914,539 B2 * | 7/2005 | Hoctor et al. ............... 455/41.2 |
| 2001/0017851 A1 * | 8/2001 | Yamaguchi et al. ......... 370/332 |
| 2002/0058503 A1 | 5/2002 | Gutowski |
| 2003/0123559 A1 | 7/2003 | Classon et al. |
| 2004/0066312 A1 * | 4/2004 | Hoctor et al. ............... 370/343 |
| 2004/0141548 A1 * | 7/2004 | Shattil ........................ 375/146 |
| 2004/0228283 A1 | 11/2004 | Naguib et al. |
| 2005/0025039 A1 * | 2/2005 | Hwang et al. ............... 370/206 |
| 2005/0085236 A1 | 4/2005 | Gerlach et al. |
| 2006/0018365 A1 * | 1/2006 | Jung et al. ................... 375/132 |
| 2006/0094363 A1 * | 5/2006 | Kang et al. ................. 455/63.1 |
| 2007/0274343 A1 * | 11/2007 | Nishio ......................... 370/479 |

FOREIGN PATENT DOCUMENTS

EP    1191804 A2    3/2002

* cited by examiner

*Primary Examiner*—Joseph H Feild
*Assistant Examiner*—Huy D Nguyen

(57) ABSTRACT

A base station (105) includes a scheduler (220) to determine a location of a user terminal (110) within a cell (125) of a wireless system (100). The cell has a cell boundary (125). The scheduler (220) also determines a subcarrier frequency diverse resource allocation for a call on the user terminal (110) in response to the location of the user terminal (110) being within a predetermined distance from an edge of the cell boundary (125). The scheduler (220) further determines a subcarrier frequency selective resource allocation for the call on the user terminal (110) in response to the location of the user terminal (110) being beyond a predetermined distance from the edge of the cell boundary. The base station (105) also includes a transceiver (215) to transmit the call according to the subcarrier frequency diverse resource allocation and the subcarrier frequency selective resource allocation.

16 Claims, 4 Drawing Sheets

METHOD AND APPARATUS FOR SCHEDULING FREQUENCY SELECTIVE AND FREQUENCY DIVERSE ALLOCATIONS IN MOBILE COMMUNICATIONS SYSTEMS

TECHNICAL FIELD

This invention relates generally to scheduling of frequency selective and frequency diverse allocations for a user of a wireless system.

BACKGROUND

Mobile communications networks typically utilize a plurality of base stations to connect mobile communication subscriber stations to a wireless network. Each of the mobile communication subscriber stations initially communicates with a base station to exchange information with the wireless network when located in a cell area serviced by the base station. However, the calls being supported for such mobile communication subscriber stations often must be handed off to different base stations when the mobile communication subscriber stations physically move from cell to cell or when the current servicing base station experiences congestion while servicing other mobile communication subscriber stations.

Institute of Electrical and Electronics Engineers ("IEEE") 802.16e and other future wireless systems will have support for both frequency selective (a.k.a. band adaptive modulation and coding ("AMC") mode) and frequency diverse operations, potentially within the same data frame by dividing (in time) a frame into a frequency selective and a frequency diverse zone. It is not, however, known how to assign a user terminal for a frequency diverse or a frequency selective zone for the best system performance.

Current wireless systems assign frequency selective or frequency diverse allocations based on, for example, the speed of the user terminal moving through the cell. The user terminal being serviced could include a Doppler detector to detect the speed of the user terminal. The base station may also make a determination of the location of the user terminal as a function of time. In both instances, however, the precise location of the user terminal is not ascertained.

In some current systems, frequency selective allocations are given to user terminals having "trustworthy" channel-quality information ("CQI") calculations. These CQI calculations take into account instantaneous fading and interference characteristics experienced by the user terminal. However, basing the assignment of the frequency selective allocation based on CQI can result in user terminals being assigned frequency selective allocations even though they are located near a cell boundary and are likely to experience uneven intercell interference.

By utilizing only CQI calculations and/or the speed of the user terminal's movement to make the assignment of frequency selective or frequency diverse allocations, incorrect allocations are often made, resulting in reduced system performance and excessive bandwidth usage.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION

Generally speaking, pursuant to these various embodiments, the exact location/position of a user terminal in communication with a base station of a wireless network is determined. Based on the determined location, either frequency selective or frequency diverse wireless allocations are provided to the user terminal by which to wirelessly communicate with the base station such as, for example, when the user terminal is a cellular telephone making a phone call. Regardless of the user terminal's CQI information, if the user terminal is within a predetermined distance from one of the geographical boundaries of the cell area serviced by the base station, frequency diverse allocations are provided to the user terminal because the user terminal is a likely to be handed over to a neighboring base station servicing a nearby cell. If, however, the user terminal is outside of the predetermined distance, then frequency selective allocations are provided to the user terminal. The base station includes a scheduler that determines whether to make frequency selective or frequency diverse allocations for a user terminal.

Figure 1:
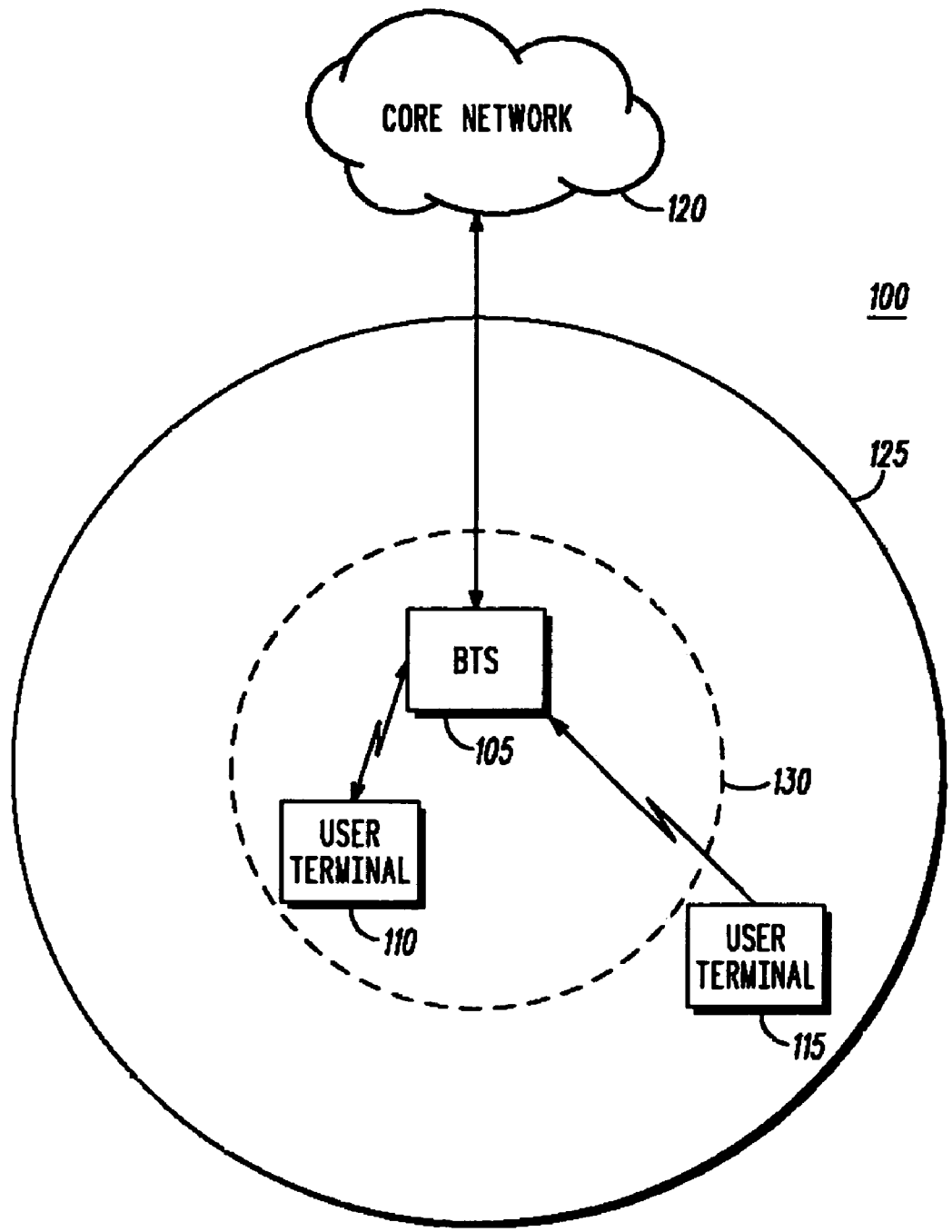
FIG. 1 illustrates a wireless system according to an embodiment of the invention.

FIG. 1 illustrates a wireless system 100 according to an embodiment of the invention. As shown, the wireless system 100 includes a base station in communication with user terminals 110 and 115. Each of the user terminals 110 and 115 may comprise, for example, a cellular telephone, a laptop computer capable of wireless communication, or a Personal Digital Assistant ("PDA"). The base station 105 is also in communication with a core network 120. When user terminal 110, for example, makes a call, the user terminal 110 communicates with the base station 105, which in turn communicates data from user terminal 110 with the core network 120. The core network 120 may communicate the data with another base station providing wireless service to another user terminal with which user terminal 110 is communicating.

The base station 105 provides wireless service to user terminals within a corresponding cell 125. The cell 125 has finite coverage capabilities and generally is less able to provide reliable service the further a user terminal 110 is from the base station 105. User terminals near the edge of the cell's 125 geographical boundaries are therefore likely candidates for being handed over to adjacent base stations and their corresponding adjacent cells that are better able to provide service to such user terminals. In the event that, for example, the user terminal 110 is within a moving automobile, a call made with the user terminal 110 may have to be handed off to neighboring base stations numerous times during the duration of the call.

The base station 105 provides allocations of wireless resources to the user terminals 110 and 115 with which the user terminals are to communicate with the base station 105. User terminals within a predetermined distance from the boundary of cell 125 are assigned frequency diverse allocations, and user terminals beyond the predetermined distance are assigned frequency selective allocations. For example, boundary 130 shown in FIG. 1 illustrates the boundary outside of which a user terminal will be assigned frequency diverse allocations, and inside of which the user terminal will be assigned frequency selective allocations. As shown, user terminal 110 is within a corresponding boundary 130 and will therefore be assigned frequency selective allocations. User terminal 115, on the other hand, is located between the boundary 130 and the edge of the cell 125. Accordingly, user terminal 115 will be assigned frequency diverse allocations. The predetermined distance may also be measured from the cell center, especially in the case of irregularly shaped cells. In this case, user terminals within a predetermined distance from the center of cell 125 are assigned frequency selective allocations, and user terminals beyond the predetermined distance are assigned frequency diverse allocations. The value of the predetermined distance may be known or unknown to the user terminal. If known, the value may be signaled to the user terminal by the base station, or predetermined upon manufacture of the user terminal.

Figure 2:
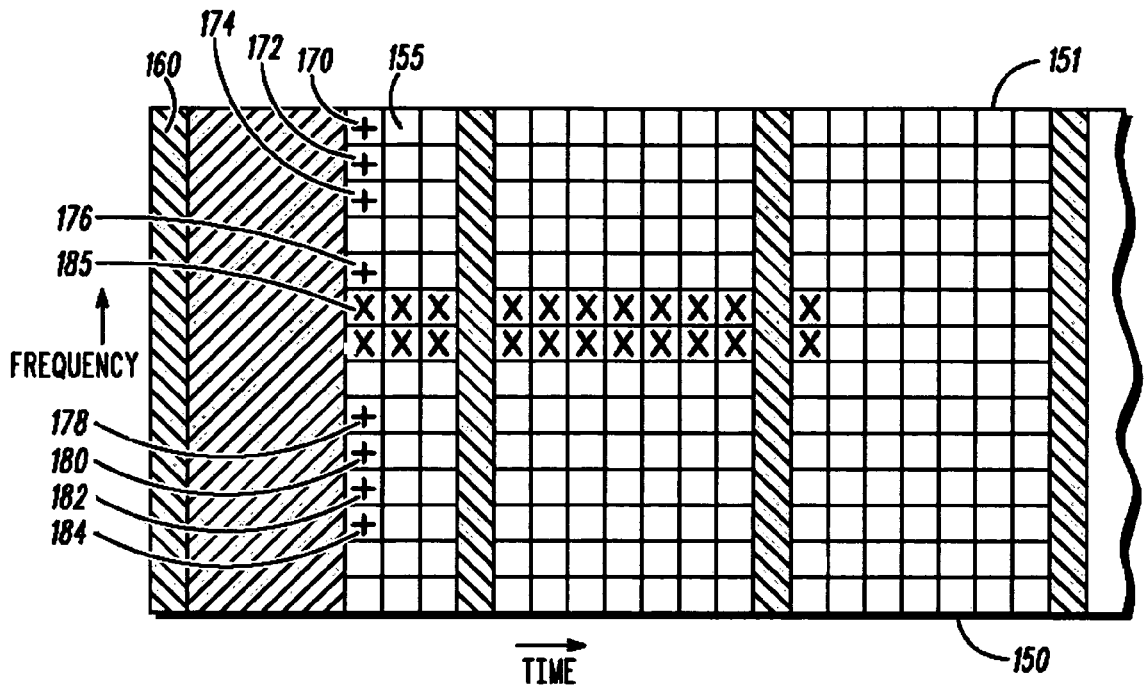
FIG. 2 illustrates a data frame utilized for communicating data between the user terminals and the base station.

FIG. 2 illustrates a portion of a data frame 150 utilized for communicating data between the user terminals 110 and 115 and the base station 105. The frame 150 includes many Orthogonal Frequency-Division Multiplexing ("OFDM") symbols 151, each spanning a number of subcarriers in frequency. Modulated data may be placed on each subcarrier within the OFDM symbol 151, where the data on each subcarrier may be known as "modulation symbols" 155. The frame 150 is shown with frequency as its vertical axis and time as its horizontal axis. The frame 150 begins with a common pilot symbol 160, followed by control symbols 165. As is known in the art, common pilot symbols 160 may be used for a number of different purposes, which include providing a reference symbol for coherent demodulation of data, synchronization to a system in time and/or frequency, and so forth. Control symbols 165 may also be used for a number of different purposes, including the assignment of modulation symbols 155 to user terminal 110 and user terminal 115. A user terminal being serviced may be assigned a number of modulation symbols 155, which may span many different subcarriers or OFDM symbols 151. In the event that a frequency diverse allocation is provided for a user terminal, a substantial plurality of the modulation symbols 155 across different subcarriers are assigned to the user terminal being serviced. For example, as illustrated, there are 14 subcarriers illustrated in FIG. 2 at a particular time. Each of the subcarriers has a different frequency. Only 14 subcarriers in the frequency direction of the data frame 150 are shown for illustrative purposes only. It should be appreciated, however, that many more than 14 subcarriers in the frequency direction may be utilized. It should also be appreciated that a different number of modulation symbols than shown may also be utilized.

In the event that a frequency diverse allocation is made, the entire band is spanned and, for example, 8 of the 14 illustrated subcarriers may be allocated to a particular user terminal being serviced. In general enough subcarriers are used such that the modulation symbols sample substantially all of the frequency diversity present in the channel. For example, modulation symbols may be distributed over 1.25 to 5 MHz of a 20 MHz frequency band. If a relatively low modulation encoding scheme is utilized, a large number of the subcarriers are required for a given packet size.

An example of a frequency diverse allocation includes the allocation of modulation symbols 170, 172, 174, 176, 178, 180, 182, and 184. As shown, this allocation of modulation symbols utilizes a substantial plurality of the different available subcarriers of the frame 150. At least some of these subcarriers utilized in the frequency diverse allocation are non-contiguous. For example, the subcarriers used in a frequency selective allocation 185, as discussed below, are located between modulation symbol 176 and modulation symbol 178. Accordingly, the subcarriers used in the frequency selective allocation 185 are not included as part of the frequency diverse allocation. By utilizing at least some subcarriers for a frequency diverse allocation that are not contiguous, at least some of the subcarriers located between the non-contiguous subcarriers may therefore be utilized for a frequency selective allocation.

The modulation symbols assigned as part of the frequency diverse allocation are denoted with boxes having a "+" through them for illustrative purposes. In this example, a majority of the subcarriers are allocated as part of the frequency diverse allocation. The allocation may also include more than one modulation symbol at a particular subcarrier frequency.

A frequency selective allocation may also be made for a particular user terminal. In a frequency selective allocation, a small number of adjacent subcarrier frequencies are allocated to the user terminal. The user terminal is also allotted as many modulation symbols at those subcarrier frequencies as will be necessary to transmit the data to and from the base station. The frequency selective allocation may utilize a higher modulation encoding scheme than that utilized by a frequency diverse allocation.

A frequency selective allocation 185 of subcarriers and modulation symbols 155 is denoted with the modulation symbols 155 having an "x" through them as shown in FIG. 2. In this example, the frequency selective allocation 185 includes 11 columns of modulation symbols 155 across two subcarriers in the data frame 150. Multiple subcarriers may be utilized, and the subcarriers may be near-contiguous or adjacent to each other, i.e., close to each other in frequency. As shown in FIG. 2, adjacent subcarriers are utilized in the frequency selective allocation. By utilizing subcarriers that are near each other in terms of frequency, data in the data frame 150 may be reliably transmitted/received.

For a particular user terminal, a frequency diverse allocation or a frequency selective allocation is made based on the location of the user terminal. In some embodiments, only frequency selective allocations or frequency diverse allocations may be made within a frame. However, in other embodiments, it may be possible to make both frequency selective and frequency diverse allocations within the same frame, either in different or the same region (zone) within the frame. A zone within a frame may comprise a number of modulation symbols 155 or even a number of OFDM symbols 151. For example, a first half of OFDM symbols 151 in a frame could comprise a first zone and a second half of OFDM symbols 151 could comprise a second zone. The control symbols 165 may contain a control field allowing both frequency selective and frequency diverse allocations within the same frame.

Note that in FIG. 2, the data frame corresponds to the downlink of a frequency division duplex ("FDD") system. However, frequency selective and diverse allocations may also be made in the uplink of an FDD system or in the uplink or downlink of a time division duplex ("TDD") system. Although common pilot symbol 160 is shown in data frame 150, the common pilot symbol may be located on different modulation symbols 155, be dedicated to a specific user (instead of common to a number of users), or not be present in the data frame 150. Similarly, while control symbols 165 are shown in data frame 150, the control symbols 165, be located on different modulation symbols 155, or not be present in the data frame. If not present in the data frame 150, the control assignment of modulation symbols to a user may be implicit (i.e., known but no signaling required), or provided in another manner (e.g., another frame, a different communication channel).

Figure 3:
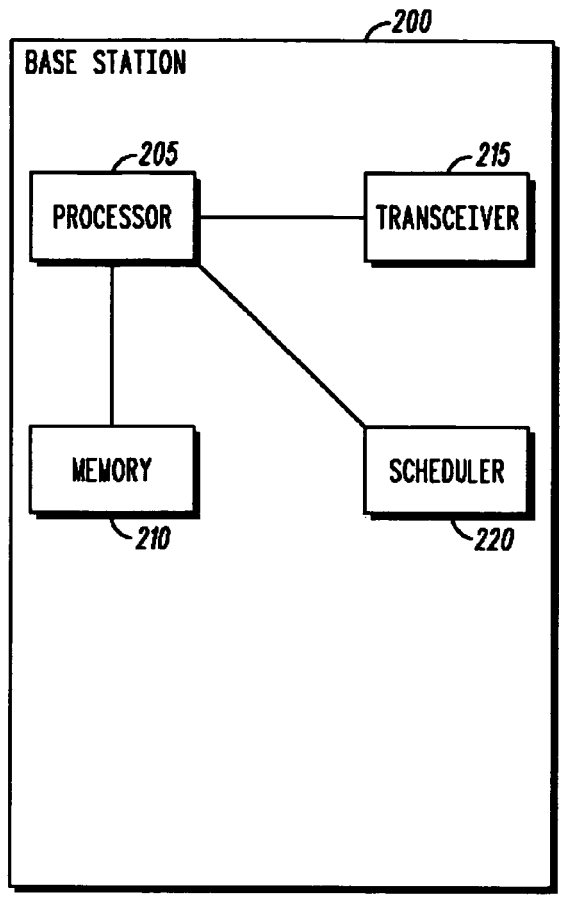
FIG. 3 illustrates a base station according to an embodiment of the invention.

FIG. 3 illustrates a base station 200 according to an embodiment of the invention. The base station 200 may include a processor 205, a memory 210, a transceiver 215, and a scheduler 220. The memory 210 may be utilized to store program code that may be executed by the processor 205. The processor 205 may be in communication with a transceiver 215 for communicating with user terminals within a cell area serviced by the base station 200. The base station 200 also includes a scheduler 220. In some embodiments, the scheduler 220 is a device physically separate from the processor 205. In other embodiments, the scheduler 220 may be implemented by the processor 205 executing program code stored in the memory 210.

Figure 4:
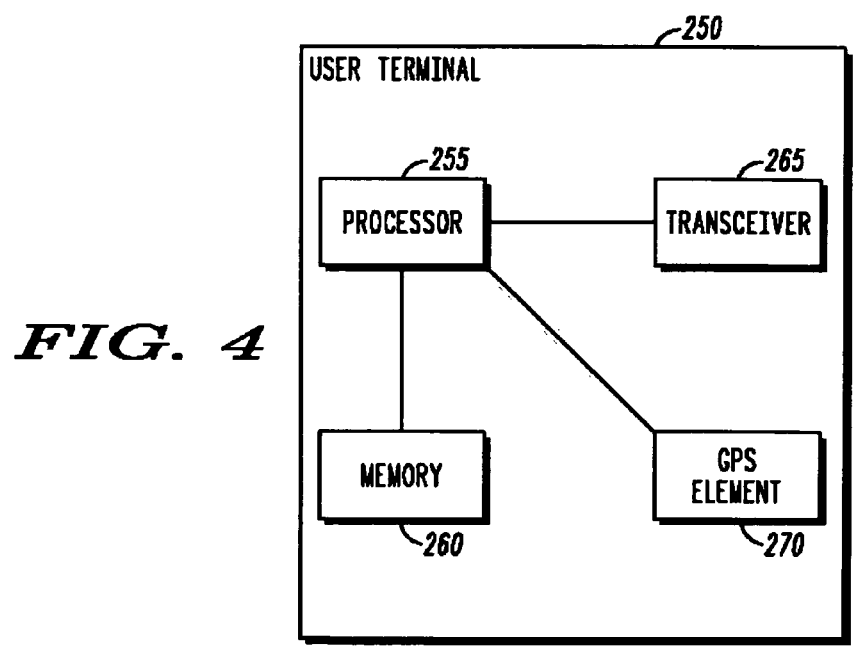
FIG. 4 illustrates a user terminal according to an embodiment of the invention.

The scheduler 220 determines whether to provide frequency diverse or frequency selective allocations to a user terminal based on a determination of the user terminal's location. The location may be determined in a number of different ways. In one embodiment, as shown in FIG. 4, a user terminal 250 includes a processor 255, a memory 260, a transceiver 265, and a Global Positioning System ("GPS") element 270. The GPS element 270 may acquire accurate information about the user terminal's location from a GPS system. The information may include GPS coordinates for the user terminal 250. After acquiring the user terminal's location, the GPS coordinates may be transmitted to the base station 200 via the user terminal's 250 transceiver 265. The GPS coordinates may be augmented, supplemented, or replaced by other information regarding or related to the user terminal's 250 location, obtained from either the user terminal 250 or another base station. For example, knowledge of nearby or interfering base stations may assist location determination. Triangulation of signals may also be used to assist location determination. In another example, long term average channel conditions and knowledge of cellular system deployment (e.g., locations of nearby base stations) and reuse patterns may be used to assist location determination.

In other embodiments in which the user terminal 250 does not have a GPS element 270, the user terminal 250 may acquire location/position information for nearby user terminals from, for example, short-range wireless communication with other user terminals using a short range technology such as Bluetooth or a Wireless Local Area Network ("WLAN") protocol of choice. The user terminal 250 may then estimate its position based on the information from neighboring terminals. Alternatively, the position information about neighboring user terminals may be transmitted to the base station 200 which may itself estimate the position of the user terminal 250. The user terminal's 250 position may also be determined using any other suitable manner as may be presently known or hereafter developed. Such methods may include the base station 200 obtaining information regarding or related to the user terminal's 250 location with respect to other base stations.

Figure 5:
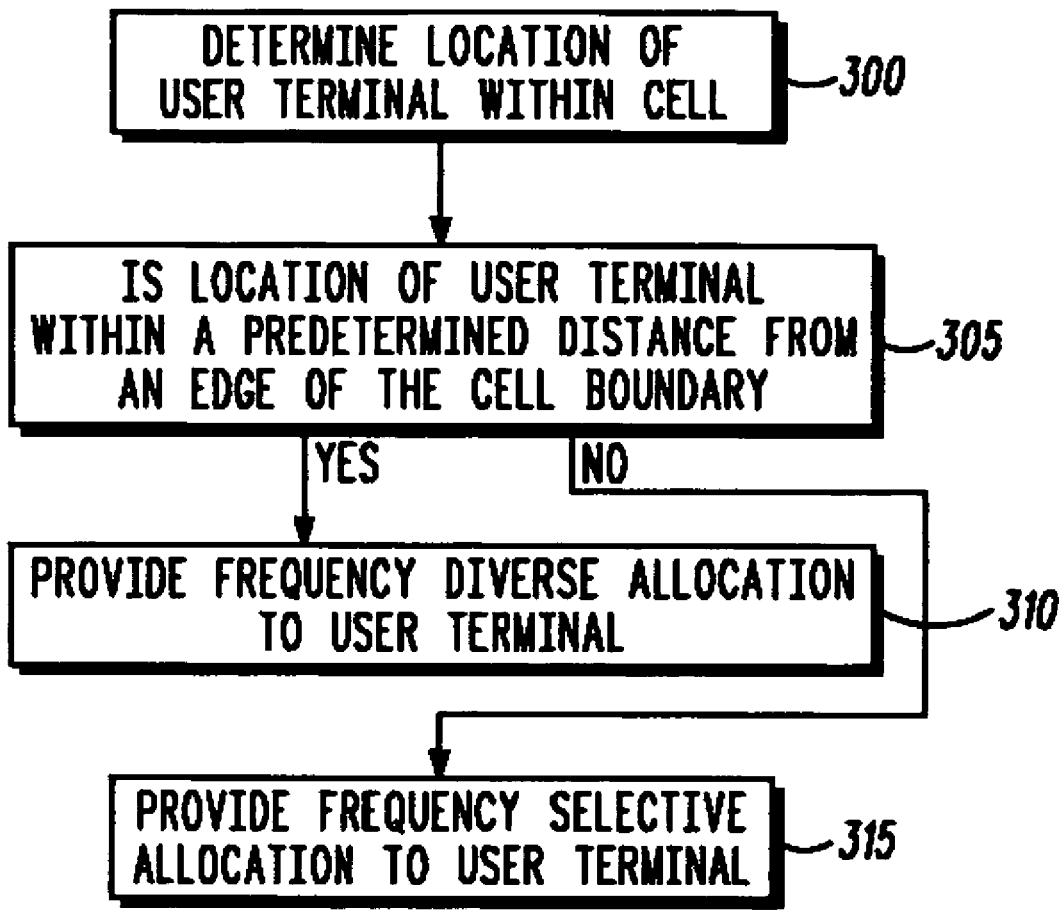
FIG. 5 illustrates a method of determining the frequency allocations for a user terminal according to an embodiment of the invention.

FIG. 5 illustrates a method of determining the frequency allocations for a user terminal according to an embodiment of the invention. First, as discussed above, at operation 300 the location of a user terminal within a cell that requires a frequency allocation is determined. Next, at operation 305, it is determined whether the location of the user terminal is within a predetermined distance from an edge of the cell boundary. As discussed above with respect to FIG. 1, the predetermined distance may be denoted by the boundary 130, inside of which the user terminal is outside of the predetermined distance. When in the area between the boundary 130 and the cell's outer boundary, the user terminal is instead determined to be within the predetermined distance from the cell boundary. If at operation 305 it is determined that the user terminal is within the predetermined distance, processing proceeds to operation 310 where a frequency diverse allocation is provided to the user terminal. If, on the other hand, it is determined at operation 305 that the user terminal is not within the predetermined distance, processing proceeds to operation 315 where a frequency selective allocation is provided to the user terminal.

As discussed above with respect to FIGS. 3 and 4, the method shown in FIG. 5 may be implemented by a scheduler located within the base station.

According to an embodiment of the invention, a simple and efficient way of allocating frequency diverse and frequency selective allocations is provided. A user terminal is within a cell serviced by a base station. The location of the user terminal is then determined by either the base station or the user terminal itself. When the user terminal is within a certain predetermined distance from a boundary of the cell, the user terminal is proved a frequency diverse allocation with which to communicate with the base station. If, on the other hand, the user terminal is outside of a certain predetermined distance from a boundary of the cell, the user terminal is proved a frequency selective allocation. A scheduler located with the base station determines and provides the wireless allocations.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method, comprising:
   determining a location of a user terminal within a cell of a wireless system, the cell having a cell boundary;
   providing a frequency diverse subcarrier resource allocation for a call on the user terminal in response to the location of the user terminal being within a predetermined distance from an edge of the cell boundary; and
   providing a frequency selective subcarrier resource allocation for the call on the user terminal in response to the location of the user terminal being beyond a predetermined distance from the edge of the cell boundary, and
   wherein providing either of the subcarrier frequency diverse resource allocation and the subcarrier frequency selective resource allocation occurs independent of a Channel Quality Indication (CQI) measurement for the call.

2. The method of claim 1, wherein the frequency diverse subcarrier resource allocation includes at least two non-contiguous subcarriers.

3. The method of claim 1, wherein the frequency selective resource allocation includes at least two near-contiguous sub-carriers.

4. The method of claim 3, wherein the at least two near-contiguous sub-carriers are adjacent.

5. The method of claim 3, wherein two near-contiguous sub-carriers are separated by not more than one sub-carrier.

6. The method of claim 1, wherein determining the location comprises using Global Position System (GPS) information to determine the location.

7. The method of claim 1, wherein determining the location comprises acquiring the location from a measurement report sent to the user terminal.

8. The method of claim 7, wherein the acquiring of the location from the measurement report includes determining whether the user terminal is in a region of the cell where cell reception of radio signals from multiple cells has been determined to be good.

9. The method of claim 1, wherein the wireless system is compliant with IEEE 802.16e.

10. The method of claim 1, wherein providing either of the subcarrier frequency diverse resource allocation and the subcarrier frequency selective resource allocation comprises providing a corresponding resource allocation using a scheduler of a base station.

11. A base station, comprising:
a scheduler to:
determine a location of a user terminal within a cell of a wireless system, the cell having a cell boundary,
determine a subcarrier frequency diverse resource allocation for a call on the user terminal in response to the location of the user terminal being within a predetermined distance from an edge of the cell boundary, and
determine a subcarrier frequency selective resource allocation for the call on the user terminal in response to the location of the user terminal being beyond a predetermined distance from the edge of the cell boundary; and
wherein the scheduler is configured and arranged to determine the subcarrier frequency diverse resource allocation and the subcarrier frequency selective resource allocation independent of a Channel Quality Indication (CQI) measurement of the call; and
a transceiver to transmit the call according to the subcarrier frequency diverse resource allocation and the subcarrier frequency selective resource allocation.

12. The base station of claim 11, further comprising a memory having Global Positioning System information stored therein and wherein the scheduler is operably coupled to the memory such that the scheduler can determine the location of the user terminal, at least in part, by using the Global Position System information.

13. The base station of claim 11, wherein the scheduler is configured and arranged to determine the location by acquiring the location from a measurement report sent to the user terminal.

14. The base station of claim 11, wherein the wireless system is compliant with IEEE 802.16e.

15. A method, comprising:
receiving a location of a user terminal within a cell of an Orthogonal Frequency Division Multiplexing (OFDM) system, the cell having a cell boundary; and
providing a subcarrier allocation for a user terminal call based on a distance of the location from the cell boundary and independent of a Channel Quality Indication (CQI) measurement of the call, the subcarrier allocation being selected from a group consisting of: a subcarrier frequency diverse resource allocation and a subcarrier frequency selective resource allocation.

16. The method of claim 15, wherein providing the subcarrier allocation comprises providing the subcarrier allocation by a scheduler of a base station.

* * * * *